March 7, 1967     S. D. PARKER     3,307,247
METHOD OF WINDING COILS
Filed Feb. 12, 1964
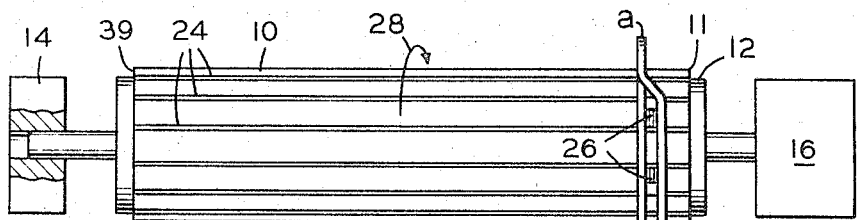
FIG. 1
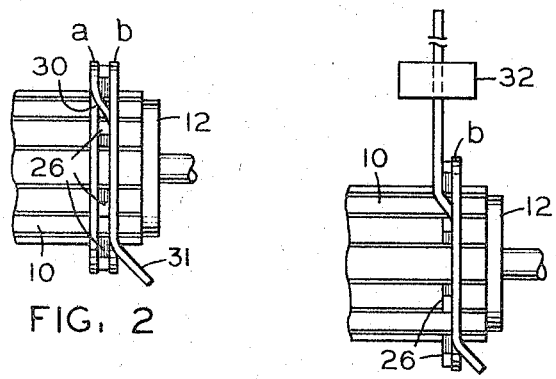
FIG. 2     FIG. 3
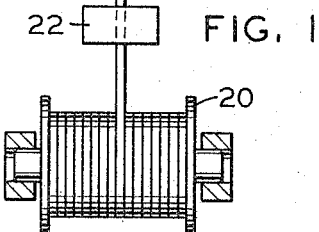
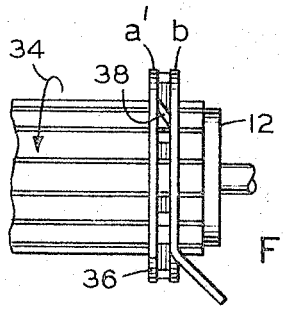
FIG. 4
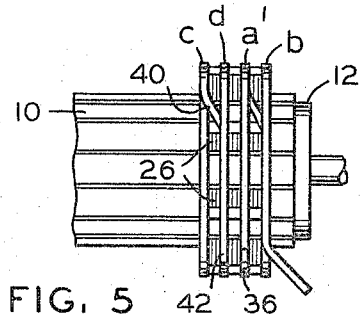
FIG. 5
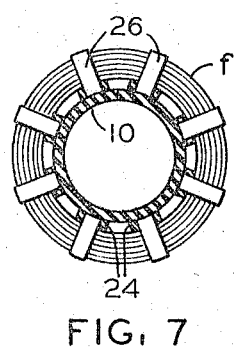
FIG. 7
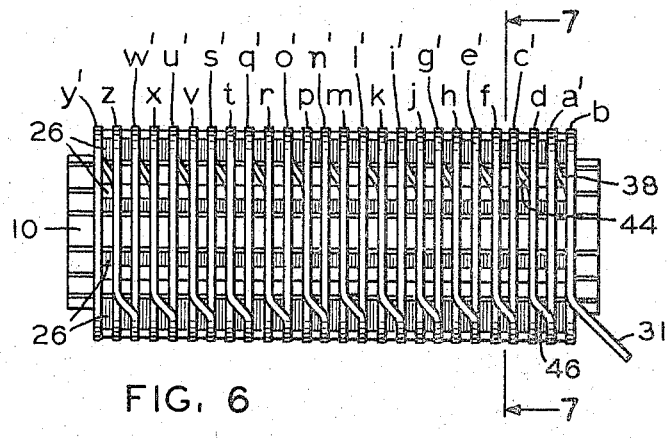
FIG. 6
INVENTOR
SHANNON D. PARKER
BY *William R. O'Meara*

United States Patent Office 3,307,247
Patented Mar. 7, 1967

3,307,247
METHOD OF WINDING COILS
Shannon D. Parker, St. Louis, Mo., assignor to Wagner Electric Corporation, St. Louis, Mo., a corporation of Delaware
Filed Feb. 12, 1964, Ser. No. 344,370
7 Claims. (Cl. 29—155.57)

This invention relates to a method of winding coils and more particularly to a method of winding connected spirally wound coils in the manufacture of disc-type inductive windings for transformers or other electrical induction apparatus.

In the manufacture of transformers, especially of the larger size and rating, disc-type inductive windings consisting of a plurality of connected flat spirally wound or annular disc-shaped coils are usually used where a considerable amount of insulation and high cooling efficiency are required. In the past, disc-shaped coils were often wound individually or in pairs at one station and then transported to another station where they were stacked onto an insulating cylinder or coil form disposed on the leg of the transformer core. The free ends of adjacent coils were then connected together as by welding, brazing or soldering to form a completed inductive winding.

There were certain undesirable features in making disc-type windings in the above described manner. For example, the disc coils had to be made with an inside diameter slightly larger than the outer diameter of the insulating cylinder so that they could be stacked thereon. This meant that the outer diameter of the winding, as well as the transformer core and casing, had to be made somewhat larger than the size necessary to otherwise meet the electrical design requirements. Also, because the coils were slightly oversize, there was some looseness of coils in the winding and relatively complicated clamping means had to be used to apply axial clamping pressures on the winding in order to prevent radial and axial movement of the coils and provide a structurally sound winding. Furthermore, in the above method there was considerable handling of the coils which resulted in relatively high labor time and cost.

Another method of winding a disc-type winding was to wind the disc coils directly onto an insulating cylinder by winding one disc coil, brazing the conductor or wire from the supply roll thereof to the inside start end of the one coil and winding the conductor on the cylinder to form a second coil, brazing the wire from the supply roll to the start end of the second coil and winding a third coil, etc. Then the outside ends of adjacent coils were welded or brazed together. While this method results in tight coils of substantially minimum dimensions, it requires a large number of welded or brazed joint connections, in fact, substantially as many joint connections as there are coils. Also, additional insulation had to be applied to each such joint connection. Since each such connection required considerable time and labor, such a method was relatively expensive.

It is therefore an object of the present invention to provide new and improved method of winding coils for an inductive winding of the disc-type whereby the above-mentioned undesirable features are substantially obviated.

Another object is to provide a novel method of making an inductive winding of the disc-type which is relatively simple and economical.

Another object is to provide a novel method of winding disc coils for an inductive winding whereby the coils of the winding tightly fit the insulating member on which they are disposed and do not require joint connections between the radially inner or inside ends of adjacent coils.

Another object is to provide an improved method of winding disc coils for a winding of an inductive apparatus wherein the disc coils are wound directly onto an insulating member used in the inductive apparatus, and whereby the radially inner ends of adjacent coils are connected by jointless connections.

These and other objects and advantages of the present invention will be apparent from the following detailed description and accompanying drawing.

Briefly, in accordance with the present invention a pair of disc coils are wound on a coil form, one of the coils is rewound so that the leading ends of the rewound coil and the other coil are connected to each other by a jointless connection, and these operations are continued until a desired number of coils is wound on the coil form.

In the drawing which illustrate embodiments of the invention,

FIGURE 1 is a diagrammatic top plan view of one form of apparatus used in the method of winding coils in accordance with the present invention, FIGURES 2–5 are fragmentary plan views of the right-hand end portion of the coil form of FIGURE 1 illustrating successive steps in the process, FIGURE 6 is a plan view of a completed inductive winding made in accordance with the invention, and FIGURE 7 is a cross-sectional view taken on line 7—7 of FIGURE 6.

Referring now to the drawing and more particularly to FIGURE 1, a coil form 10, on which the inductive winding made according to the invention is formed, is shown as a conventional insulating winding cylinder mounted on a rotatable drum 12 for rotation therewith. The drum 12 is supported for rotation at one end by a standard 14 and is connected at the other end to a drive unit 16 which is capable of effecting rotation of the drum and cylinder in either direction. An insulated conductor or wire 18 from a rotatably supported supply roll 20 is passed through a wire tensioning device 22 and wound onto the cylinder in forming each coil of the winding. The wire 18 is shown in the drawing as being rectangular in cross-section. The tensioning device 22 may be any suitable means for resisting or retarding the movement of the wire 18 as it is drawn onto the rotating cylinder 10 so as to produce tightly wound coils which tightly fit the cylinder. Such tensioning devices are well known and may consist, for example, of a pair of members spring biased into engagement with the opposite sides of the wire to retard the movement thereof. The cylinder 10 is provided with axially extending circumferentially spaced insulating spacers 24, such as paperboard strips secured to the cylinder, which provide axial cooling ducts in the finished winding structure and which also may be used to secure radially extending insulating coil spacers 26. The coil spacers 26, which may be made of paperboard, have radially inner ends disposed between adjacent axial spacers 24 and with the sides thereof engaged by the axial spacers to hold the radial spacers in place. The spacers 24 and 26 may be provided with mating surfaces such as by forming them with complementary tongue and groove configurations, if desired.

In forming a disc-type winding according to the present invention, the free end of wire 18 is temporarily secured by any suitable removable clamping means (not shown) to the cylinder 10 near the start end thereof, which end is indicated at 11. The drive unit 16 is then energized to rotate the cylinder in the direction of arrow 28 to thereby form a "reservoir" coil *a* which is a flat, annular, spirally wound coil or disc coil. As used herein, a "reservoir" coil refers to a coil which is wound on the cylinder and provides a predetermined length of conductor which is subsequently collapsed or unwound, and then rewound into a disc coil as a permanent coil of the inductive winding.

After reservoir coil *a* has been wound, the wire is bent axially and radially inwardly toward the cylinder surface and then the cylinder is again rotated in the direction of arrow 28 to produce a permanent disc coil *b* disposed on that side of the coil *a* which faces the start end or right-hand end 11 of the cylinder, as seen in FIGURE 2. It should be noted that the reservoir coil *a* and coil *b* are formed without severing or interrupting the continuity of the wire therebetween. Thus, the outside or trailing end of coil *a* and the inside or leading end of coil *b* are connected by a jointless connection indicated at 30. The wire from the supply roll is severed at the trailing or outside end of coil *b* to provide coil *b* with a free end 31, which end subsequently serves as an end connection of the inductive winding. The radial spacers 26 serve to guide the turns of coil *b* into proper position on the cylinder.

After coil *b* has been wound, reservoir coil *a* is unwound or collapsed and the wire thereof passed through a tensioning device 32, as illustrated in FIGURE 3, and rewound onto the cylinder by rotating the cylinder in the opposite direction, as indicated by arrow 34 in FIGURE 4, to form a permanent disc coil *a'* having a free outside or trailing end 36. It should be noted that disc coil *b* is connected to disc coil *a'* by a jointless connection, indicated at 38, that is, the inside or leading end of coil *b* is connected to the inside or leading end of coil *a'* without having interrupted the continuity of the conductor therebetween or formed a joint or brazed connection. Coil *a'* is disposed on the left-hand side of coil *b* or on that side of coil *b* which faces toward the finish end of the cylinder, which end is indicated at 39. Coil *a'*, of course, becomes a permanent disc coil of the winding. The turns of coil *a'* are guided onto the cylinder by spacers 26 so that the coil *a'* fits tightly against the spacers shown in FIGURE 4.

Next, a reservoir disc coil *c* is formed, as seen in FIGURE 5, by temporarily securing the free end of the wire 18 to the cylinder 10 and rotating the cylinder in the direction of arrow 28. Coil *c* is wound on the cylinder of sufficient distance to the left of coil *a'* to permit the winding of the next coil *d* between the coils *c* and *a'*. Without severing the wire from the supply spool at the outside trailing end of reservoir coil *c*, the wire is bent axially and inwardly toward the cylinder which is again rotated in the direction indicated by arrow 28 to thereby wind the next disc coil *d*, adjacent coil *a'*. The coil *d* is wound on the left-hand side of coil *a'* as viewed in FIGURE 5, and is located between the reservoir coil *c* and coil *a'*. It will be noted that the outside trailing end of coil *c* is connected to the inside leading end of coil *d* by a jointless connection at 40. The wire is severed from the supply spool after completing coil *d* to provide coil *d* with a free outside trailing end which is indicated at 42.

The reservoir coil *c* is then collapsed or unwound, and the wire which formed coil *c* placed in the wire tensioning device 32 and then rewound on the cylinder 10 on the left-hand side of coil *d* by rotating the cylinder in the direction indicated by arrow 34 in FIGURE 4. This produces the fourth permanent coil *c'*. Coil *c'* has its inside leading end connected to the inside leading end of coil *d* by means of a jointless or uninterrupted connection which is indicated at 44 in FIGURE 6 of the drawing wherein the completed winding is shown.

Each of the succeeding pairs of coils, *e'–f*, *g'–h*, *i'–j*, etc., are formed in the same manner as previously described in connection with each of the paris *a'–b* and *c'–d*. Thus, in forming each of these pairs of coils, a reservoir coil is first formed by winding the wire onto the winding cylinder by rotating the cylinder in one direction, winding wire onto the cylinder by rotating it in the same direction to form a permanent coil on that side of the reservoir coil which faces the start end of the cylinder and without interrupting the continuity of the wire between them, and then rewinding the wire from the reservoir coil to form the second permanent coil of the pair on that side of the first permanent coil which faces toward the finish end of the cylinder.

The outside free ends of adjacent coils are soldered, brazed or welded together to connect the coils in series relationship and form the completed winding. For example, outside free end 36 of coil *a'* and the outside free end 42 of coil *d* (see FIGURE 5) are joined as by brazing to provide a brazed outside joint connection between these coils as indicated at 46 in FIGURE 6. Each brazed joint connection between the free ends of adjacent coils is insulated as by covering the brazed joint connection with a suitable insulating tape.

The completed inductive winding on the cylinder 10 may be removed from the drum 12 and placed on a winding leg of a magnetic core of a transformer. Usually disc-type windings are used as high voltage primary windings, and in such case, the winding as shown in FIGURE 6, for example, may be used as a primary winding or a section of a primary winding and placed over a secondary winding or a portion of a secondary winding that is disposed on the same leg of the transformer.

It should be noted that each disc coil is wound outwardly from the inside to the outside and thus is simple to wind. Also, each disc coil is tightly wound directly on the insulating cylinder to be used in the finished apparatus to thus provide coils which tightly fit the cylinder and are of minimum dimensions. Also, all of the joint connections between coils of the inductive winding shown in FIGURE 6 are on the radially outer side of the winding and only jointless connections between coils are at the radially inner side of the winding.

In the process described herein, the inductive winding is wound by forming successive pairs of disc coils from the right-hand end of the cylinder 10 to the left-hand end, but obviously the pairs of coils could be successively formed from the left-hand end to the right-hand end of the cylinder, or the winding could be formed by winding coils from each end toward the center of the mandrel, if desired. For example, if it was desired to wind disc coils on the cylinder 10 from the left-hand end 39 to the right-hand end 11, a reservoir coil would be wound on the cylinder near end 39 and, without interrupting the continuity of the wire, a permanent coil would be wound on the left-hand side of the reservoir coil, and then the reservoir coil would be collapsed and rewound on the right-hand side of the first permanent coil. The successive pairs of coils would be wound in this same manner. Also, while all of the coils of the winding shown in FIGURE 6 are connected successively in series from one end to the other, it will be apparent that various coils or groups of coils may be connected in various other circuit relationships.

While a particular mode of practicing the invention has been illustrated and described herein, it will be obvious to those skilled in the art that changes and modifications may be made without departing from the true spirit and scope of the invention which is limited only by the following claims.

The embodiments of the invention in which an exclusive property or privilege is claimed are defined as follows:

1. A method of winding a plurality of axially disposed disc coils onto a coil form comprising the steps of rotating the coil form in one direction while feeding insulated wire from a supply thereof to the coil form to produce a first spirally wound disc coil having concentric turns, without interrupting the continuity of the wire from the supply thereof rotating the coil form in said one direction while feeding wire thereto to produce a second spirally wound disc coil having concentric turns and disposed on the coil form axially spaced from said first coil, severing the wire from said supply at the outer turn of said second coil, collapsing the first coil, rotating the coil form in the opposite direction while preventing the second coil from unwinding and feeding the wire from the collapsed first coil onto the coil form to produce a spirally wound rewound first coil having concentric turns and with the second coil adjacent one side of the rewound first coil, rotating the coil form in said one direction while preventing the second and said rewound first coils from unwinding and feeding insulated wire from a supply thereof to the coil form to produce a third spirally wound disc coil having concentric turns on the coil form sufficiently axially spaced from and on the opposite side of the first rewound coil to provide space on the coil form for a fourth coil between the third and said rewound first coils, without interrupting the continuity of the wire from the third coil rotating the coil form in said one direction while preventing the second and said rewound first coils from unwinding and feeding wire thereto to produce a fourth spirally wound coil having concentric turns disposed between the third coil and said rewound first coil with one side of the fourth coil adjacent said opposite side of said rewound first coil severing the wire from the supply at the outer turn of said fourth coil, collapsing the third coil, and rotating the coil form in the opposite direction while preventing the second, said rewound and the fourth coils from unwinding and feeding the wire from the collapsed third coil onto the coil form to produce a rewound third coil on the opposite side of said fourth coil.

2. A method of winding a plurality of coaxial series connected spiral wound disc type coils onto a coil form in the manufacture of an electrical inductive winding comprising the steps of rotating a coil form in one direction while feeding insulated wire under tension from a supply thereof to the coil form to form a first spirally wound coil of concentric turns, without severing the wire from said supply rotating the coil form in said one direction while feeding wire thereto to form a second spirally wound coil of concentric turns without severing the wire from said supply rotating the coil form in said one direction while feeding wire thereto to form a second spirally wound coil of concentric turns and which is disposed axially on one side of the first coil, severing the wire adjacent the outer turn of the second coil, collapsing the first coil while preventing the unwinding of said second coil rotating the coil form in the opposite direction to rewind the first coil on said one side of the second coil thus providing an integral jointless portion of said wire between the inner turn of the second coil and the inner turn of the rewound first coil, rotating the coil form in said one direction while preventing the unwinding of the second and rewound first coil and feeding the wire thereto to form a third spirally wound coil of concentric turns and which is axially spaced on the side of the rewound first coil opposite the side on which the second coil is disposed to provide space on the coil form for a fourth coil, without severing the wire from said third coil and while preventing the unwinding of the second and rewound first coils rotating the coil form in said one direction to form the fourth spirally wound coil of concentric turns between the third coil and the rewound first coil, severing the wire adjacent the other turn of the fourth coil, collapsing the third coil, and while preventing the unwinding of the second, rewound, first and fourth coils rotating the coil form in said opposite direction to rewind the third coil adjacent the fourth coil thus providing an integral jointless portion of said wire between the inner turn of the fourth coil and the inner turn of the rewound third coil, and interconnecting the outer turns of the rewound first coil and the fourth coil whereby the second coil, the rewound first coil, the fourth coil, and the rewound third coil are successively disposed axially along the coil form and connected in series circuit relationship in the order named.

3. The method of winding a plurality of coils in the manufacture of an electrical inductive winding comprising the steps of winding insulated conductor means on a coil form to successively wind a pair of axially disposed disc like coils each having spirally wound turns with the radially outer turn of the first formed coil of said pair connected to the radially inner turn of the second wound coil of said pair by an integral jointless portion of said conductor means, then collapsing the first wound coil, rewinding the portion of the conductor means that formed the first wound coil on the coil form into a disc like coil having spirally wound turns disposed axially of said second wound coil and with the radially inner turns of said rewound coil and said second wound coil connected by an integral jointless portion of said conductor means.

4. The method according to claim 3 including the steps of winding other insulated conductor means on said coil form to successively wind a second pair of axially disposed disc like coils each having spirally wound turns with the radially outer turn of the first wound coil of said second pair connected to the radially inner turn of the second wound coil of said second pair by an integral jointless portion of said other conductor means, and with the second wound coil of said second pair disposed axially between the first wound coil of said second pair and said rewound coil, then collapsing the first wound coil of said second pair, rewinding the portion of said other conductor means that formed said first wound coil of said second pair to wind a second rewound disc like coil having spirally wound turns with the inner turn thereof connected with the inner turn of the second formed coil of said second pair by an integral jointless portion of said other conductor means, and subsequently interconnecting the outer turn of the first named rewound coil and the outer turn of the second wound coil of said second pair.

5. The method of winding a plurality of disc like coils onto a coil form in the manufacture of an electrical inductive winding comprising the steps of rotating the coil form in one direction while supplying insulated conductor means thereto to form a first disc like coil on said coil form which has spiral turns, then without interrupting the continuity of the conductor means rotating the coil form in said one direction while supplying the conductor means thereto to form a second disc like coil having spiral turns and disposed on said coil form axially of said first coil, collasping the first coil and, while preventing the second coil from unwinding, rotating the coil form in the opposite direction to wind that portion of the conductor means that formed the first coil into a rewound disc like coil having spiral turns and which is disposed on the coil form axially of the second coil and with the inner turns of the rewound coil and the second coil connected by an integral jointless portion of said conductor means.

6. The method according to claim 5 wherein said conductor means is supplied to said coil form under tension so that each of said coils is tightly wound thereon.

7. The method according to claim 5 including the steps of rotating said coil form in said one direction while preventing said rewound and said second coils from unwinding and while supplying other insulated conductor means thereto to form a third disc like coil having spiral turns disposed on the coil form sufficiently axially spaced from rewound coil to provide winding space on said coil form between said third coil and said rewound coil for the winding of a fourth disc like coil having spiral turns and disposed between said third and said rewound coils, then without interrupting the continuity of said other conductor means rotating said coil form in said one direction while preventing said rewound and said second coils from unwinding and while supplying said other conductor means thereto to form said fourth coil, then collapsing said third coil, rotating said coil form in said opposite direction while preventing said rewound said second, and said fourth coils from unwinding and supplying the portion of the other conductor means that formed the third coil to the coil form to form a disc like rewound coil having spiral turns axially disposed on said coil form adjacent said fourth coil with the inner turns of said last named rewound coil and said fourth coil interconnected by an integral jointless portion of said other conductor means, and interconnecting the outer turns of said first named rewound coil and said fourth coil, whereby said second coil, said first named rewound coil, said fourth coil, and said last named rewound coil, in the order named, are successively disposed on the coil form and connected in series relationship.

References Cited by the Examiner
UNITED STATES PATENTS

| 892,763 | 7/1908 | Pfanstiehl | 336—185 |
| 2,368,506 | 1/1945 | Paluev | 336—60 |
| 2,986,716 | 5/1961 | Carlon | 336—232 X |

JOHN F. CAMPBELL, *Primary Examiner.*

R. W. CHURCH, *Assistant Examiner.*